United States Patent [19]

Kanda

[11] Patent Number: 5,333,847
[45] Date of Patent: Aug. 2, 1994

[54] ELASTIC MOUNT HAVING AT LEAST TWO ORIFICES FORMED BY RUBBER FILLER ON ORIFICE-DEFINING STRUCTURE WHICH EXTENDS ALONG AT LEAST ONE OF TWO FLUID CHAMBERS

[75] Inventor: Ryouji Kanda, Komaki, Japan

[73] Assignee: Tokai Rubber Industries, Ltd., Japan

[21] Appl. No.: 973,391

[22] Filed: Nov. 10, 1992

[30] Foreign Application Priority Data

Nov. 13, 1991 [JP] Japan .................................. 3-325326

[51] Int. Cl.$^5$ ............................................. F16F 13/00
[52] U.S. Cl. .................... 267/140.12; 267/219
[58] Field of Search ........... 267/140.11, 140.12, 267/219; 248/562, 636, 638; 180/300, 312, 902

[56] References Cited

U.S. PATENT DOCUMENTS

| | | |
|---|---|---|
| 4,802,658 | 2/1989 | Ushijima et al. . |
| 4,884,789 | 12/1989 | Takeda et al. ............... 267/140.12 |
| 5,040,774 | 8/1991 | Veverka et al. ............. 267/140.12 |
| 5,178,373 | 1/1993 | Takeguchi et al. .......... 267/140.12 |
| 5,188,346 | 2/1993 | Hamada et al. ............. 267/140.12 |
| 5,213,313 | 5/1993 | Tsutsumida et al. ........ 267/140.12 |

FOREIGN PATENT DOCUMENTS

| | | |
|---|---|---|
| 56-164242 | 12/1981 | Japan . |
| 63-289349 | 11/1988 | Japan . |
| 2-5937 | 2/1990 | Japan . |
| 3113141 | 5/1991 | Japan ............... 267/140.12 |
| 3-49315 | 10/1991 | Japan . |

*Primary Examiner*—Robert J. Oberleitner
*Assistant Examiner*—Kevin D. Rutherford
*Attorney, Agent, or Firm*—Parkhurst, Wendel & Rossi

[57] ABSTRACT

A fluid-filled cylindrical elastic mount having an elastic body interposed between inner and outer sleeves and cooperating with the outer sleeve to define two fluid chambers which communicate with each other through two orifice passages. An orifice-defining structure is interposed between the outer sleeve and the elastic body, so as to cover at least one of the two chambers, and has a circumferential recess open in the radially outward direction of the outer sleeve. The orifice-defining structure has two windows formed therethrough in the radial direction, and a rubber filler in the recess. The filler has two grooves one of which cooperates with one of the windows and the outer sleeve to define a first orifice passage for communication between the two chambers, and the other of which cooperates with the outer sleeve to define a second orifice passage which permits flow of a fluid between the two chambers, through elastic displacement of a flexible diaphragm which closes the other window. The two orifice passages are tuned to damp or isolate vibrations in different frequency bands.

23 Claims, 9 Drawing Sheets

ELASTIC MOUNT HAVING AT LEAST TWO ORIFICES FORMED BY RUBBER FILLER ON ORIFICE-DEFINING STRUCTURE WHICH EXTENDS ALONG AT LEAST ONE OF TWO FLUID CHAMBERS

BACKGROUND OF THE INVENTION

1. Field of the Invention

The present invention relates to a fluid-filled cylindrical elastic mount for flexibly connecting two or mounting one of the two members on the other member, in a vibration-damping manner. More particularly, the present invention is concerned with such a fluid-filled cylindrical elastic mount suitable as an engine mount for a motor vehicle, for example, which is capable of effectively damping or isolating vibrations over a wide frequency range.

2. Discussion of the Prior Art

As a vibration damper interposed between two members of a vibration system, for flexibly connecting the two members or flexibly mounting one of the two members on the other member, there is known a so-called fluid-filled cylindrical elastic mount as disclosed in JP-A-56-164242 and JP-A-63-289349. The elastic mount as disclosed in these publications has an inner sleeve, an outer sleeve radially outwardly spaced from the inner sleeve, and an elastic body interposed between the inner and outer sleeves for elastically connecting these sleeves. The outer sleeve and the elastic body cooperate to define a first and a second fluid chamber which communicate with each other through an orifice passage.

The fluid-filled cylindrical elastic mount of the type indicated above exhibits excellent vibration damping characteristics based on the resonance of a non-compressible fluid flowing through the orifice passage between the two fluid chambers, upon application of a vibrational load between the inner and outer sleeves. The damping characteristics exhibited by this type of elastic mount are superior to those exhibited by an elastic mount which does not contain a non-compressible fluid and which relies solely on the elasticity of an elastic body. The fluid-filled cylindrical elastic mount is typically used as an engine mount, a differential mount and a suspension bushing for a motor vehicle.

However, the known fluid-filled cylindrical elastic mount of the above type provides a sufficiently high damping effect with respect to a certain frequency range of the input vibrations. That is, the damping of the input vibrations based on the resonance of the fluid flowing through the orifice passage is effective only to a predetermined frequency band to which the orifice passage is tuned. When the frequency of the input vibration is higher than the predetermined frequency band, the amount of the fluid flow through the orifice passage is almost negligible as if the orifice passage were closed, and the elastic mount is not capable of exhibiting a sufficiently high damping effect with respect to the higher frequencies.

In view of the drawback experienced on the known fluid-filled cylindrical elastic mount, the assignee of the present application developed a fluid-filled elastic mount having two independent orifice passages which extend between two fluid chambers, as disclosed in JP-B-2-5937. In this elastic mount, the ratio of the cross sectional area to the length of the second orifice passage is made higher than that of the first orifice passage, and a movable plate is disposed in the second orifice passage, so as to restrict the amount of flow of the non-compressible fluid through the second orifice passage.

In the elastic mount of the type indicated just above, the movable plate is displaced to cause fluid flow through the second orifice passage upon application of vibrations of relatively high frequencies to which the first orifice passage is not effective to damp. Consequently, the elastic mount provides a high damping effect with respect to such high-frequency vibrations, based on the resonance of the fluid flowing through the second orifice passage. Therefore, this type of elastic mount is capable of effectively damping or isolating the input vibrations over a relatively wide frequency range.

A further study by the present inventors on the known fluid-filled cylindrical elastic mount having two orifice passages revealed a drawback which arises from the provision of the two mutually independent orifice passages and the movable plate disposed in the second orifice passage. That is, the elastic mount requires a complicated structure for defining the two orifice passages and movably supporting the movable plate. The structure uses a relatively large number of components, and requires a cumbersome procedure for assembling the components.

SUMMARY OF THE INVENTION

It is therefore an object of the present invention to provide a fluid-filled cylindrical elastic mount of a simple structure with a relatively small number of components, which is capable of effectively damping input vibrations over a relatively wide frequency range, based on the resonance of a non-compressible fluid flowing through a plurality of orifice passages tuned to different frequency bands of the vibrations.

The above object may be achieved according to the principle of the present invention, which provides a fluid-filled cylindrical elastic mount comprising: a) an inner and an outer sleeve which are radially spaced apart from each other; (b) an elastic body interposed between the inner and outer sleeves, for elastically connecting the inner and outer sleeves, the elastic body having a first and a second pocket formed in respective diametrically opposite circumferential portions thereof, the first and second pockets being open in an outer circumferential surface of the elastic body, the first and second pockets cooperating with the outer sleeve to define a first and a second fluid chamber, respectively, the first and second fluid chambers being filled with a non-compressible fluid; (c) an orifice-defining structure interposed between the outer sleeve and the elastic body, and extending in a circumferential direction of the outer sleeve, so as to cover at least one of the first and second pockets, the orifice-defining structure having a circumferential wall which defines a bottom of a circumferential recess open in a radially outward direction of the outer sleeve, the orifice-defining structure having a first and a second window formed through the circumferential wall; (d) a rubber filler provided in the circumferential recess, and having a first and a second groove which extend from the first and second windows, respectively; and (e) a flexible diaphragm formed integrally with the rubber filler and closing the second window. The first groove and the first window cooperate with the outer sleeve to define a first orifice passage for fluid communication between the first and second fluid chambers. The second groove cooperates with the outer sleeve to define a second orifice passage which permits the fluid to flow between the first and second fluid chambers, through elastic displacement of the flexible diaphragm. The second orifice passage has a higher ratio S/L than the first orifice passage, where S and L respectively represent a cross sectional area and a length of the first and second orifice passages.

In the fluid-filled cylindrical elastic mount of the present invention constructed as described above, the rubber filler provided in the circumferential recess of the orifice-defining structure forms both of the first and second orifice passages which are tuned to damp or isolate vibrations in different frequency bands. Further, the flexible diaphragm which permits fluid flow through the second orifice passage is formed as an integral part of the rubber filler. This arrangement makes it possible to reduce the number of components necessary to define the two orifice passages, and to facilitate the manufacture and improve the assembling efficiency of the elastic mount.

In the cylindrical elastic mount of the present invention, the resonance frequencies of the fluid flowing through the first and second orifice passages are determined by the cross sectional area and length of the first and second grooves formed in the rubber filler. Therefore, the orifice passages can be easily tuned as desired, by suitably designing the configurations of the two grooves to be formed in the rubber filler. In other words, the frequency bands of vibrations to be damped based on the resonance of the fluid flowing through the two orifice passages can be easily changed by simply changing the design of the rubber filler, without changing the orifice-defining structure on which the rubber filler is provided.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
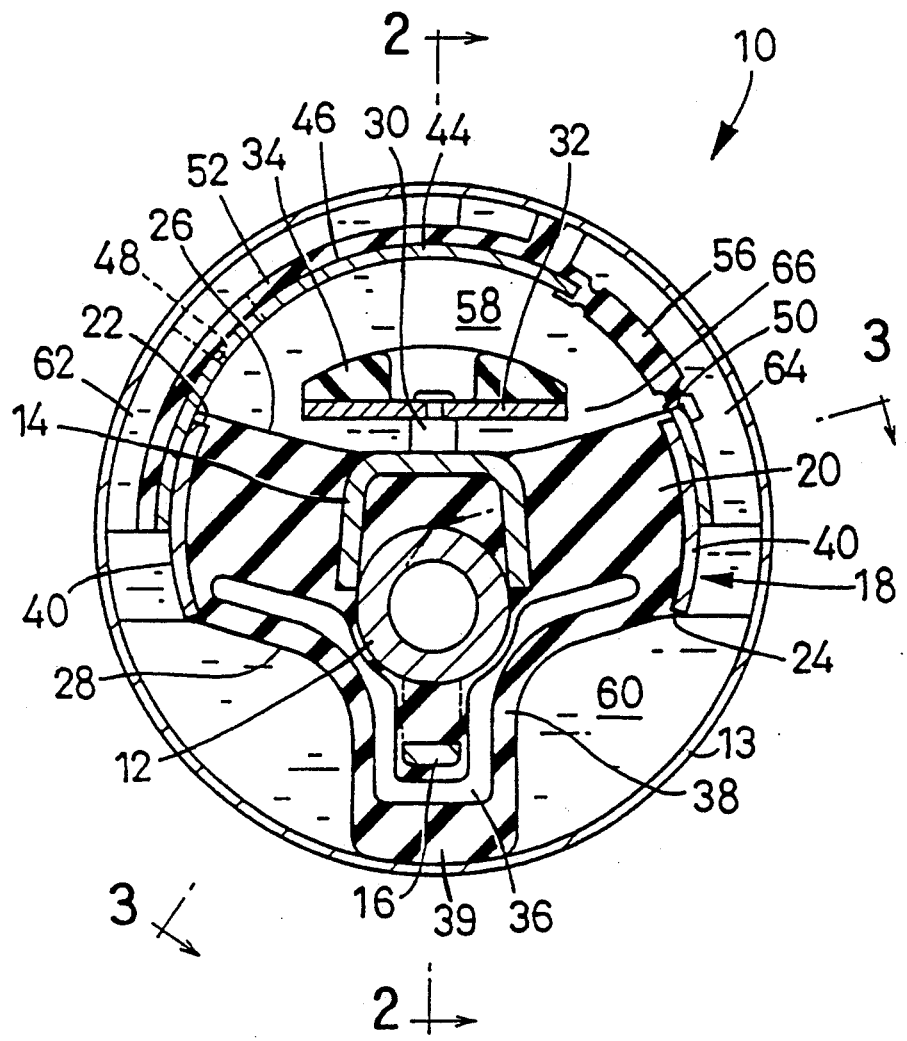
FIG. 1 is an elevational view in transverse cross section of one embodiment of a fluid-filled cylindrical elastic mount of the present invention in the form of an engine mount for a motor vehicle.
Figure 2:
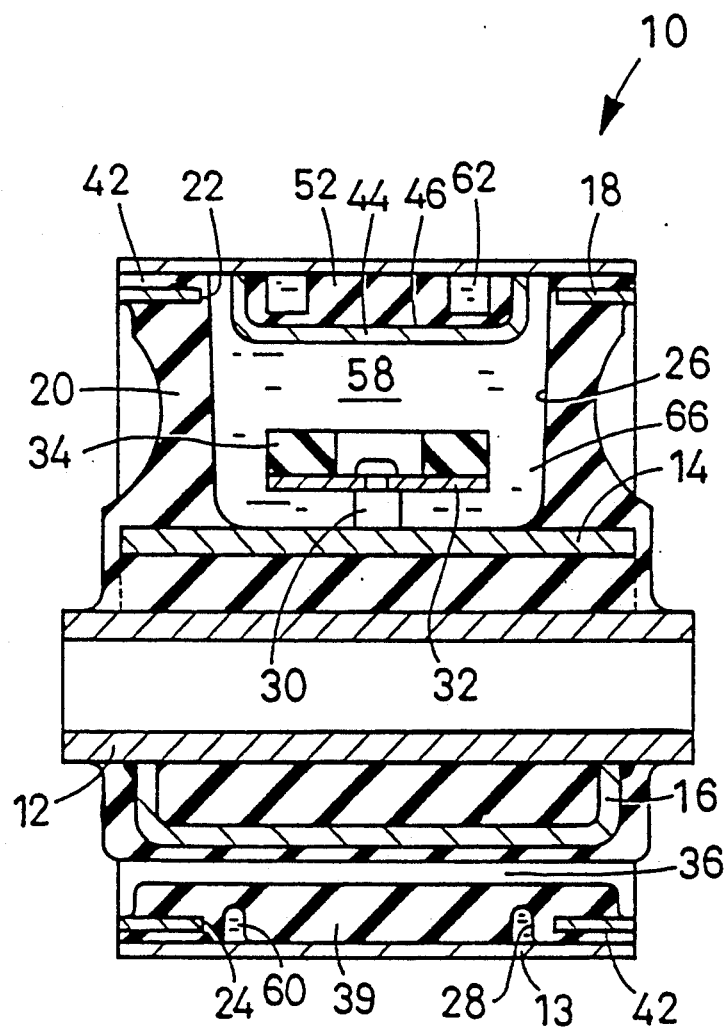
FIG. 2 is an elevational view in axial cross section taken along line 2—2 of FIG. 1.
Figure 3:
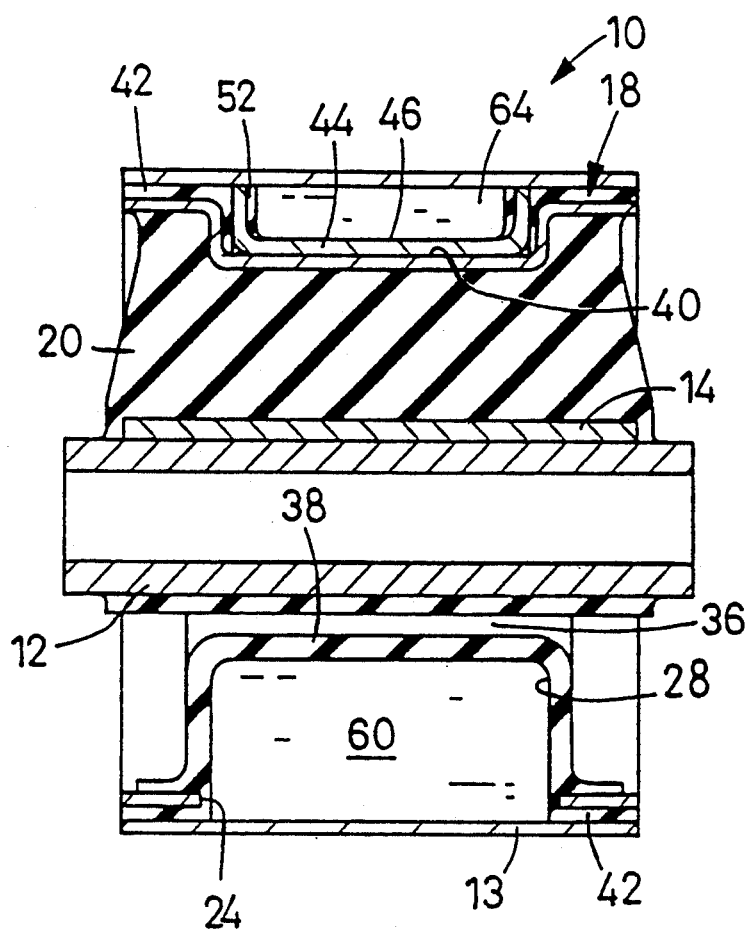
FIG. 3 is an elevational view in axial cross section taken along line 3—3 of FIG. 1.

Referring first to FIGS. 1-3, the fluid-filled cylindrical elastic engine mount for a front-drive front-engine motor vehicle is indicated generally at 10. In these figures, reference numerals 12 and 13 denote an inner sleeve and an outer sleeve which are made of suitable metallic materials. The inner and outer sleeves 12, 13 are radially spaced apart from each other and are eccentric with each other when the engine mount 10 is not installed on the vehicle. These two sleeves 12, 13 are elastically connected to each other by an elastic body 20 interposed therebetween. The engine mount 10 is installed on the motor vehicle so as to mount a power unit of the vehicle on the vehicle body, in a vibration damping manner, such that the inner sleeve 12 is fixed to the vehicle body, while the outer sleeve 13 is fixed to the outer sleeve 13 so that the weight of the power unit acts on the outer sleeve 13. In a static condition of the vehicle, the inner and outer sleeves 12, 13 are substantially concentric or coaxial with each other, with the elastic body 20 elastically deformed by a given amount.

The inner sleeve 12 has a relatively large radial wall thickness, and has a support member 14 and a stopper 16 secured thereto at respective diametrically opposite positions thereof as shown in FIG. 1 and 2. The support member 14 has a generally U shape in cross section of FIG. 1, while the stopper 16 is generally pan-shaped as shown in FIG. 2.

Radially outwardly of the inner sleeve 12, there is disposed an intermediate sleeve 18 made of a metal. This intermediate sleeve 18 is eccentrically offset with respect to the inner sleeve in the diametric direction in which the support member 14 and the stopper 16 are opposed to each other, such that the radial distance between the two sleeves 12, 18 is larger on the side of the support member 14, than on the side of the stopper 16. When the present engine mount 10 is installed in place on the vehicle, the intermediate sleeve 18 as well as the outer sleeve 13 is made substantially concentric with the inner sleeve 12, with the weight of the power unit acting on the outer sleeve 13.

The elastic body indicated above is formed by vulcanization of a suitable elastomeric material between the inner and intermediate sleeves 12, 18, so as to provide an integral inner assembly in which the inner and intermediate sleeves 12, 18 are elastically connected to each other.

The intermediate sleeve 18 of the inner assembly has a first and a second opening 22, 24 formed in respective circumferential portions thereof which are substantially opposed to each other in the diametric direction in which the inner and intermediate sleeves 12, 18 are offset from each other. These openings 22, 24 are formed in an axially middle portion of the sleeve 18, as indicated in FIG. 2. On the other hand, the elastic body 20 has a first and a second pocket 26, 28 corresponding to the first and second openings 22, 24 of the intermediate sleeve 18, such that the first and second pockets 26, 28 are open on the outer circumferential surface of the intermediate sleeve 18, through the respective first and second openings 22, 24 of the sleeve 18.

The support member 14 has a leg 30 secured thereto, which extends into the first pocket 26 of the elastic body 20, in the radial direction of the inner sleeve 12. Within the first pocket 26, there is disposed a wing member 32 fixed to the leg 30. The wing member 32 is generally plate-shaped, having a plane perpendicular to the direction of extension of the leg 30. The wing member 32 has a rubber buffer 34 formed on one of its opposite major surfaces which is remote from the leg 30.

Between the inner sleeve 12 and the surface defining the second pocket 28 of the elastic body 20, there is formed an axial void 36 which extends through the entire axial length of the elastic body 20. This axial void 36 and the second pocket 26 cooperate to define a thin-walled portion 38 of the elastic body 20, which is easily displaceable. Stated differently, elastic displacement or deformation of the thin-walled portion 38 permits easy change of the volume and shape of the second pocket 26. The thin-walled portion 38 is formed with a thick-walled buffer portion 39 provided at a circumferentially middle position of the second pocket 26, so that the stopper 16 is interposed between the inner sleeve 12 and the thick-walled buffer portion 39. Although FIG. 1 shows the buffer portion 39 in abutting contact with the outer sleeve 13, the buffer portion 39 is spaced from the inner surface of the outer sleeve 13, due to displacement of the outer sleeve 13 when the engine mount 10 is installed on the vehicle, with the weight of the power unit acting on the outer sleeve 13

As shown in FIGS. 1 and 3, the intermediate sleeve 18 has a pair of part-circumferential grooves 40, 40 formed in the axially middle portion. These grooves 40, 40 are open radially outwardly of the sleeve 18, and extend between the first and second pockets 22, 24 in the circumferential direction of the sleeve 18, for communication between the first and second pockets 26, 28 of the elastic body 20. As shown in FIGS. 2 and 3, the outer circumferential surfaces of the axially opposite end portions of the intermediate sleeve 18 are covered by respective sealing rubber layers 42 which are formed integrally with the elastic body 20, over the entire circumference of the sleeve 18.

An orifice-defining structure in the form of a generally arcuate orifice-defining member 44 is disposed extending circumferentially of the intermediate sleeve 18, so as to cover the opening of the first pocket 26, such that the opposite end portions of the member 44 are fitted in the respective part-circumferential grooves 40, 40 of the sleeve 18. The orifice-defining member 44 has an arcuate or part-circumferential recess 46 in its outer surface. As is shown in FIGS. 2 and 3, the recess 46 has a width which slightly smaller than the dimension of the member 44 as measured in the axial direction of the engine mount 10. The orifice-defining member 44 is preferably formed by pressing.

Figure 4:
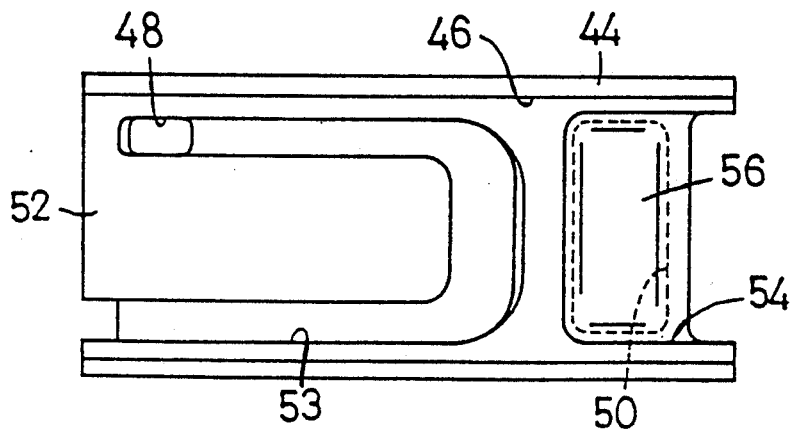
FIG. 4 is a plan view of an orifice-defining member used in the engine mount of FIG. 1.

As shown in FIG. 4, the orifice-defining member 44 has a first window 48 having a relatively small size formed at one of its opposite ends, and a second window 50 formed near the other end. The second window 50 is larger in size than the first window 48, and has a dimension smaller but almost equal to the width of the recess 46. The first window 48 is located near one widthwise end of the recess 46.

The recess 46 of the orifice-defining member 44 is filled with a rubber filler 52, in which there are formed a first groove 53 having a relatively small width, and a second groove 54 whose width is almost equal to the size of the second window 50 in the width direction of the recess 46. The first groove 53 is U-shaped as seen in FIG. 4. The width of the U-shaped groove 53 is equal to the size of the first window 48 in the width direction of the recess 46. The first, U-shaped groove 53 communicates at one end thereof with the first window 48, and the other end is located at the end of the recess 46 at which the first window 48 is provided. As is apparent from FIG. 4, the second groove 54 communicating with the second window 50 has a considerably smaller length than the first groove 53.

The second window 50 is closed by a flexible diaphragm 56 formed integrally with the rubber filler 52. The diaphragm 56 is bonded by vulcanization to the periphery to the window 50, for fluid-tight closure of the window 50, and has a comparatively small thickness for easy elastic deformation.

The outer sleeve 13 is fitted on the outer circircumference of the inner assembly in which the orifice-defining member 44 is incorporated. This operation to assemble the outer sleeve 13 and the inner assembly is conducted within a mass of a non-compressible fluid such as alkylene glycol, polyalkylene glycol or silicone oil. As a result, the first and second pockets 36, 38 formed in the elastic body 20 are closed by the outer sleeve 13, and are filled with the non-compressible fluid. The thus prepared engine mount 10 is radially inwardly pre-compressed by drawing, using, for example, eight drawing dies disposed around the circumference of the outer sleeve 13, so that the outer sleeve 13 is compressed against the outer circumferential surface of the intermediate sleeve 18, via the sealing rubber layers 42 which assure fluid-tightness of the closed first and second pockets 26, 28.

The engine mount 10 thus produced has a pressure-receiving chamber 58 corresponding to the first pocket 26, and an equilibrium chamber 60 corresponding to the second pocket 28. Upon application of a vibrational load between the inner and outer sleeves 12, 13, the pressure of the fluid in the pressure-receiving chamber 58 is subject to change due to elastic deformation of the elastic body 20. As indicated above, the volume of the equilibrium chamber 60 is easily changeable due to the elastic deformation or displacement of the thin-walled portion 38 of the elastic body 20, which partially defines the chamber 60 (second pocket 28). The volumetric change of the equilibrium chamber 60 absorbs a pressure change in the same chamber 60.

The first and second grooves 53, 54 formed in the orifice-defining member 44 are also closed by the outer sleeve 13, whereby a first passage 62 and a second orifice passage 64 are formed. The first orifice passage 62, which corresponds to the first groove 53, holds the pressure-receiving and equilibrium chambers 58, 60 in fluid communication with each other, and permits the fluid to flow therebetween. The second orifice passage 64 corresponding to the second groove 54 extends between the two fluid chambers 58, 60, and permits the fluid to flow between these fluid chambers, through elastic deformation or displacement of the flexible diaphragm 56, which occurs upon pressure changes in the pressure-receiving chamber 58.

The second orifice passage 64 has a higher ratio S/L than the first orifice passage 62, where S represents the cross sectional area of the passages 62, 64 (grooves 53, 54), while L represents the length of the passages 62, 64 (grooves 53, 54). Accordingly, the resonance frequency of the fluid flowing through the second orifice passage 64 is higher than that of the fluid flowing through the first orifice passage 62. In this specific example, the dimensions of the first orifice passage 62 (first groove 53) are tuned to exhibit an excellent damping effect with respect to low-frequency vibrations of about 10–15 Hz such as shake and bounce, based on the resonance of the fluid flowing through the first orifice passage 62, while the dimensions of the second orifice passage 64 (second groove 54) are tuned to exhibit a sufficiently low dynamic spring constant with respect to medium-frequency vibrations of about 20–30 Hz such as engine idling vibration produced when the vehicle engine is idling.

When the low frequency-vibration such as shake and bounce is applied between the inner and outer sleeves 12, 13, the fluid is forced to flow through the first orifice passage 62 between the pressure-receiving and equilibrium chambers 58, 60, due to a difference between the fluid pressures in the two fluid chambers 58, 60. Accordingly, the low-frequency vibration is effectively damped based on the resonance of the fluid flowing through the first orifice passage. At this time, the amount of flow of the fluid through the second orifice passage 64 is restricted by spring stiffness of the flexible diaphragm 56, that is, the diaphragm 56 undergoes only a limited amount of elastic displacement upon application of the low-frequency vibration. Therefore, a sufficient amount of the fluid is forced to flow through the first orifice passage 62 to provide a sufficient damping effect with respect to the low-frequency vibration.

When the medium-frequency vibration such as the engine idling vibration is applied between the inner and outer sleeves 12, 13, the amount of change in the fluid pressure in the pressure-receiving chamber 58 is relatively small, since the amplitude of the medium-frequency vibration is comparatively small. Consequently, the fluid flow through the first orifice passage 62 is almost negligible as if the passage 62 were closed, but the flexible diaphragm 56 is elastically displaced due to a relatively small amount of changes in the fluid pressure in the pressure-receiving chamber 58, whereby the fluid flows through the second orifice passage 64, so as to absorb the pressure changes in the chamber 58, and the engine mount 10 exhibits an effectively reduced dynamic spring constant with respect to the medium-frequency vibration, based on the resonance of the fluid flowing through the second orifice passage 64.

Thus, the first and second orifice passages 62, 64 provided in the present engine mount 10 cooperate to assure a sufficiently high damping effect for shake and bounce or other low-frequency vibration, and a sufficiently low dynamic spring constant with respect to engine idling vibration and other medium-frequency vibration. Further, high-frequency vibration of about 200–300 Hz such as booming noises produced during running of the vehicle can also be effectively isolated with a sufficiently low dynamic spring constant based on the resonance of the fluid flowing through an annular resonance portion or restricted fluid passage 66 which is defined by and between the periphery of the wing member 32 and the inner surface of the pressure-receiving chamber 58. Thus, the present engine mount 10 is capable of effectively damping or isolating the input vibrations over a wide range of frequency.

The resonance frequencies of the first and second orifice passages 62, 64 are determined by the dimensions of the respective first and second grooves 53, 54 formed in the rubber filler 52 provided in the recess 46 of the orifice-defining member 44. Accordingly, the first and second orifice passages 62, 64 can be easily tuned by suitably designing the configuration of the rubber filler 52, more precisely, the configurations (cross sectional area and length) of the first and second grooves 53, 54 formed in the rubber filler 52. Namely, the frequency bands of vibrations to be damped based on the resonance of the fluid flowing through the two orifice passages 62, 64 can be easily changed by simply changing the design of the rubber filler 52, without changing the orifice-defining member 44.

Further, the flexible diaphragm 56 which permits the fluid flows through the second orifice passage 64 is formed as an integral part of the rubber filler 52 which defines the orifice passages 62, 64. Thus, the number of components incorporated in the engine mount 10 for fulfilling the intended functions is comparatively small, and the efficiency of assembling of the engine mount 10 is significantly improved.

Figure 5:
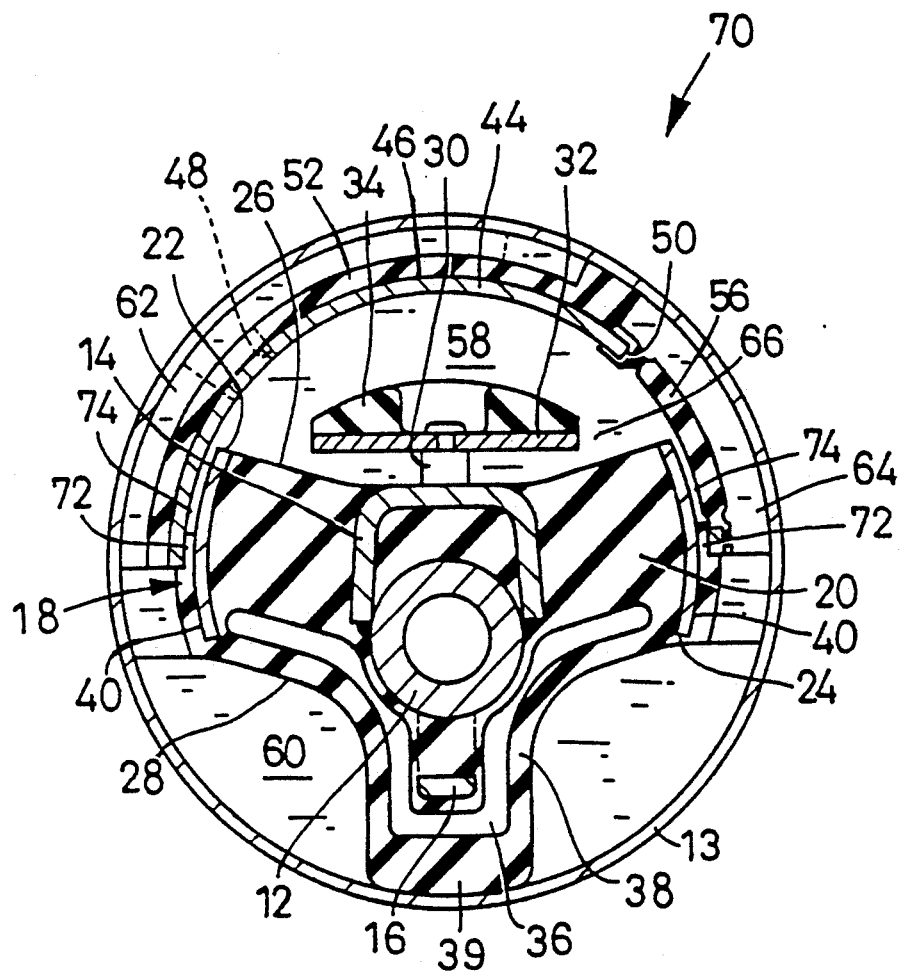
FIG. 5 is an elevational view in transverse cross section showing an example of modification of the engine mount of FIG. 1.

Referring next to FIG. 5, there is illustrated a fluid-filled elastic engine mount 70, which is a modification of the engine mount 10 according to the first embodiment of FIGS. 1–4.

In the engine mount 70, the diameter of the part-circumferential grooves 40, 40 of the intermediate sleeve 18 is smaller than that of the orifice-defining member 44. More precisely, the diameter of the outer circumferential surfaces which define the depth of the grooves 40, 40 is smaller than the inner diameter of the bottom wall of the recess 46 of the orifice-defining member 44. Between the end portions of the inner bottom surface of the recess 46 of the orifice-defining member 44 and the corresponding portions of the outer circumferential surfaces of the grooves 40 of the intermediate sleeve 18, there are interposed elastic spacer layers 72, so that there is provided a radial gap 74 between the other portions of the intermediate sleeve 18 and the corresponding portion of the orifice-defining member 44. In this arrangement, the gap 74 permits an increased degree of freedom in selecting the circumferential position and area of the first and second windows 48, 50 to be formed through the orifice-defining member 44. As shown in FIG. 5, the circumferential position of the second window 50 provided in the present embodiment is different from that in the first embodiment shown in FIG. 1. Thus, the present engine mount 70 has an increased degree of freedom in determining the vibration damping characteristics.

Figure 6:
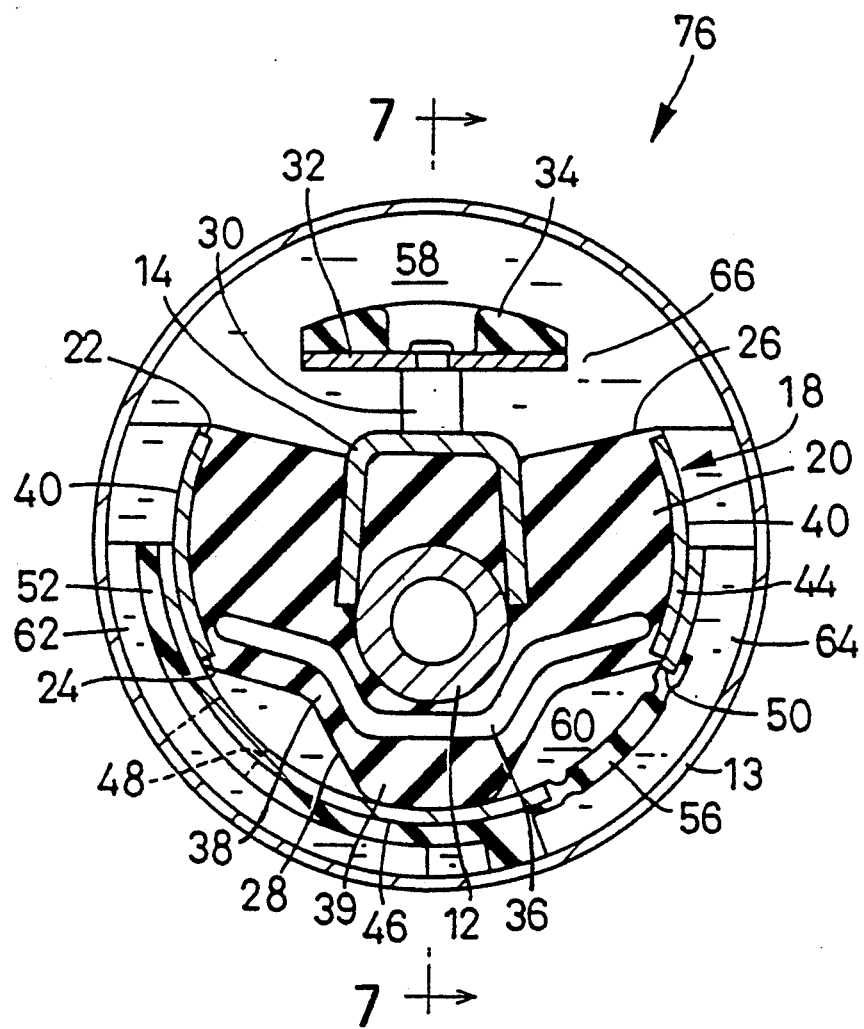
FIG. 6 is an elevational view in transverse cross section showing another example of modification of the engine mount of FIG. 1.
Figure 7:
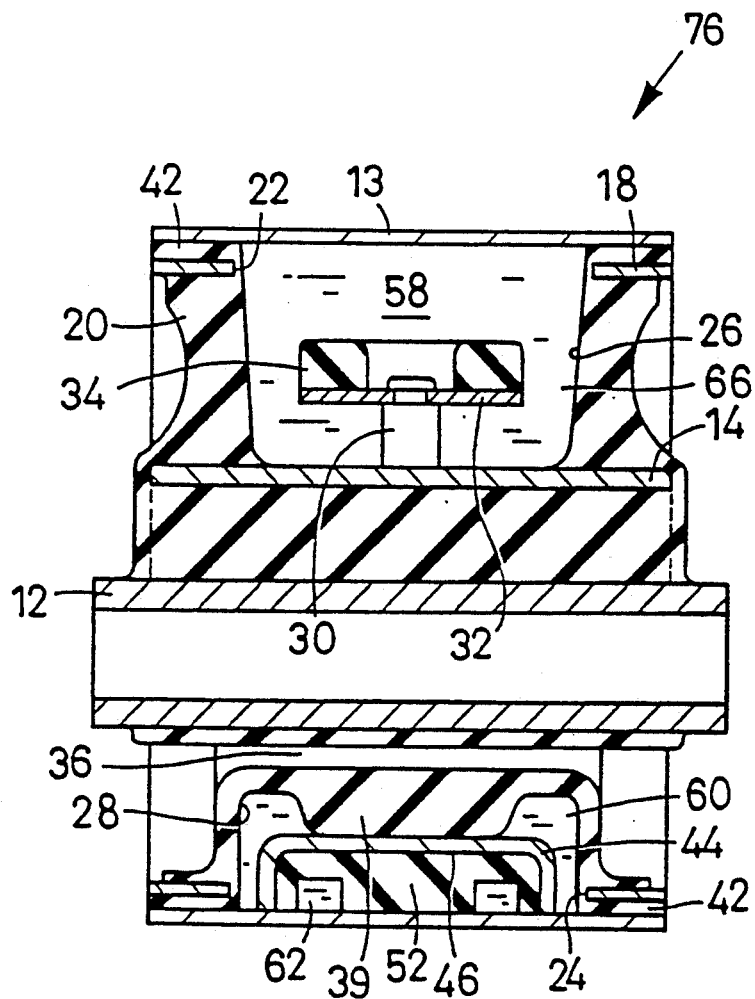
FIG. 7 is an elevational view in axial cross section take along line 7—7 of FIG. 6.

Referring next to FIGS. 6 and 7, there is illustrated another modification of the first embodiment, in the form of an engine mount 76. In this modified embodiment, the orifice-defining member 44 having the first and second grooves 53, 54 is disposed extending so as to cover the second pocket 28 or equilibrium chamber 28, so that the first and second orifice passages 62, 64 are formed such that the first window 48 and flexible diaphragm 56 are exposed to the equilibrium chamber 60, rather than to the pressure-receiving chamber 58.

Reference is now made to FIGS. 8–11, which show a second embodiment of this invention in the form of an engine mount 80. In the interest of brevity and simplification, the same reference numerals as used in the first embodiment are used in the second embodiment, to identify the corresponding elements, and no redundant description of these elements will be given.

Figure 8:
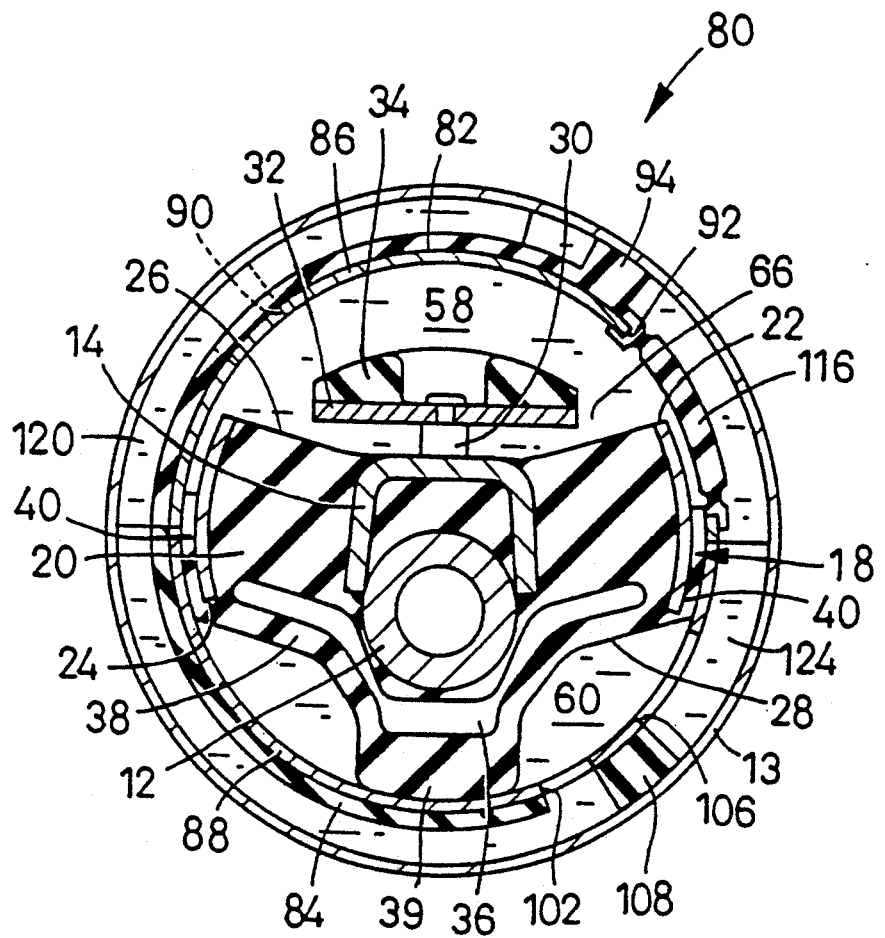
FIG. 8 is an elevational view in transverse cross section of another embodiment of this invention, also in the form of a vehicle engine mount, showing two orifice-defining members as taken along line 8—8 of FIGS. 10 and 11.
Figure 9:
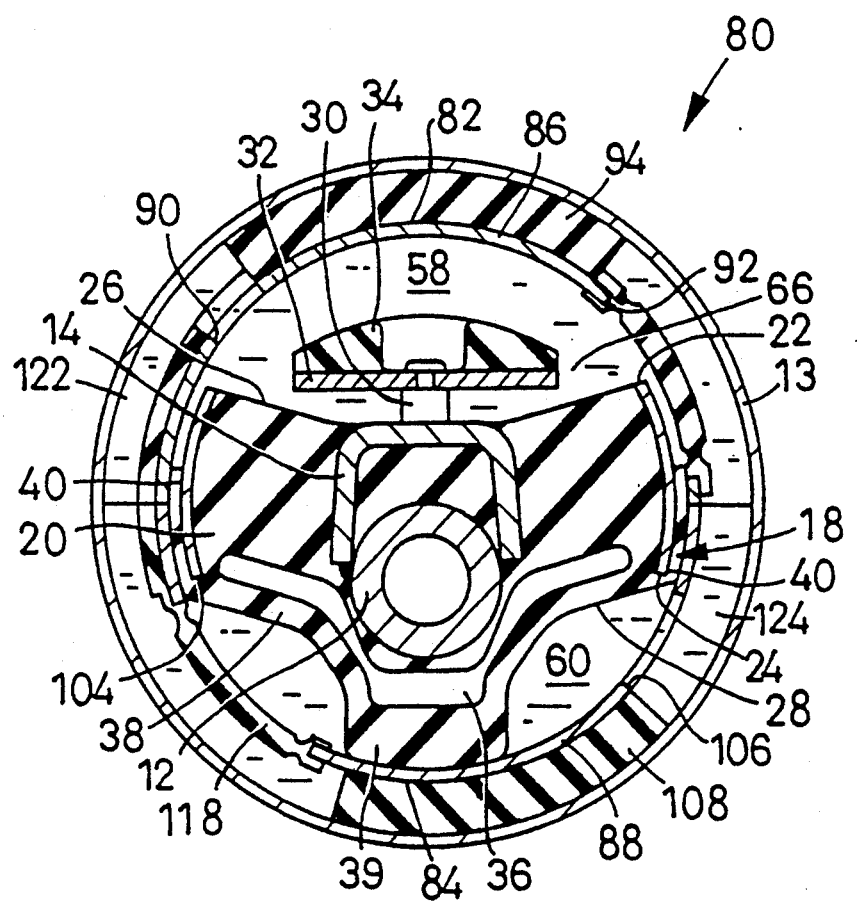
FIG. 9 is an elevational view in transverse cross section of the engine mount of FIG. 8, showing the orifice-defining members as taken along line 9—9 of FIGS. 10 and 11.

The present engine mount 80 uses a first and a second semi-circular orifice-defining member 86, 88 which have respective wide recesses 82, 84 formed in the outer surfaces. The two semi-circular orifice-defining members 86, 88 are butted together at their ends, at which the men%hers 86, 88 are fitted in the part-circumferential grooves 40, 40 of the intermediate sleeve 18. The first and second orifice-defining members 86, 88 are disposed extending so as to cover the arcuate openings of the respective first and second pockets 26, 28, as seen in FIGS. 8 and 9.

Figure 10:
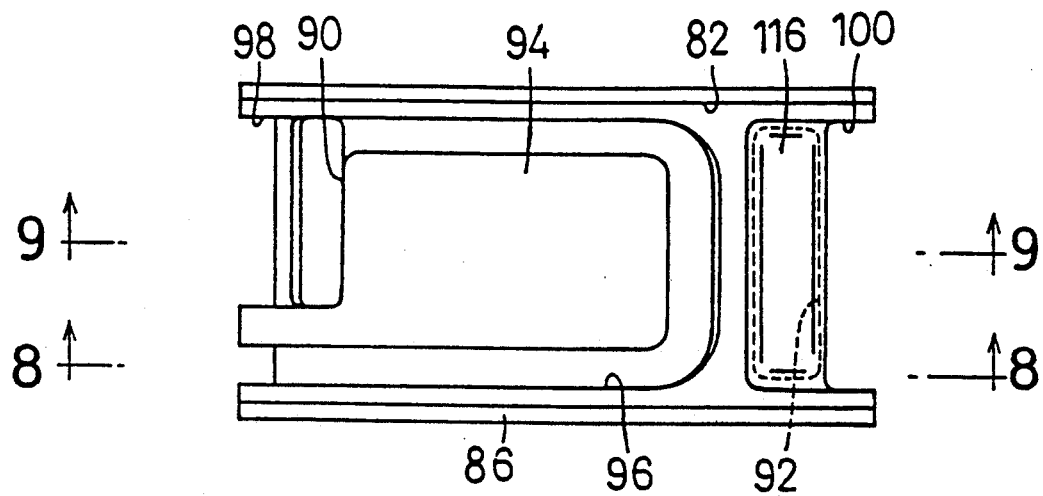
FIG. 10 is a top plan view of the first orifice-defining member shown in FIGS. 8 and 9.

As shown in FIG. 10, the first orifice-defining member 86 has a first window 90 formed near one of its opposite ends, and a second window 92 formed near the other end. The second window 92 has a larger area than the first window 90. The recess 82 is filled with a rubber filler 94 which has three grooves 96, 98 and 100. The first groove 96 is U-shaped as seen in FIG. 10, and has a relatively small width. Further, the first U-shaped groove 96 communicates at one end thereof with the first window 90, and the other end is located at the end of the recess 82 at which the first window 90 is formed. The second groove 98 has a width considerably larger than that of the first groove 96, and is formed between the first window 90 and the end of the member 86 remote from the second window 92. The third groove 100 has a width slightly larger than that of the second groove 98, and communicates with the second window 92. The third groove 100 is open at the end of the member 86 remote from the first window 90.

Figure 11:
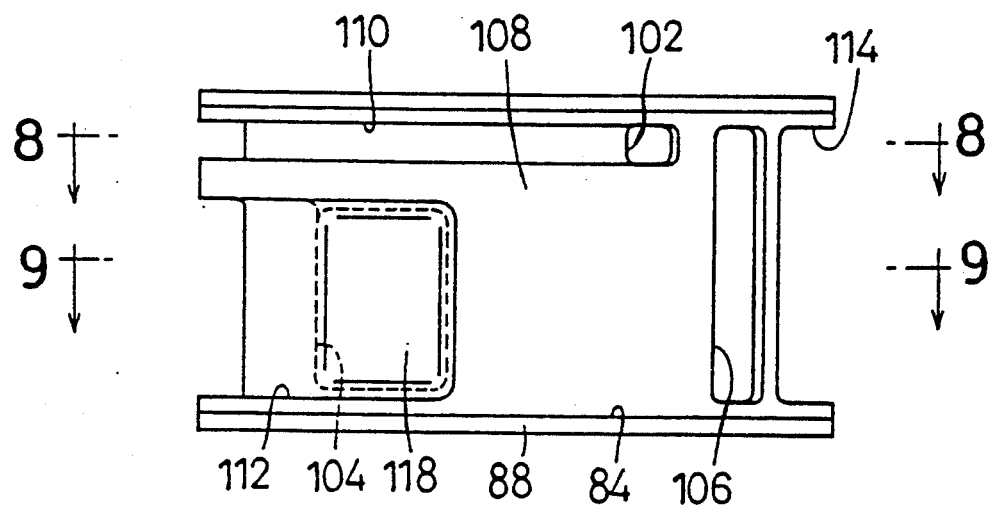
FIG. 11 is a bottom plan view of the second orifice-defining member shown in FIGS. 8 and 9.

As shown in FIG. 11, the second orifice-defining member 88 has a third window 102, a fourth window 104 and a fifth window 106, which are formed such that the third window 102 is intermediate between the fourth and fifth windows 104, 106. The fourth window 104 has a larger area than the third window 102, and the fifth window 106 has a larger width than the fourth window 104, in the direction of width of the recess 84.

The recess 84 of the second orifice-defining member 88 is filled with a rubber filler 108 which has a fourth groove 110, a fifth groove 112 and a sixth groove 114. The fourth groove 110 communicates at one end thereof with the third window 102, and the other end is located at the end of the member 88 remote from the fifth window 106. The fourth groove 110 has the same cross sectional shape as the first groove 96 of the first orifice-defining member 86. The fifth groove 112 communicates at one end thereof with the fourth window 104, and the other end is located at the end of the member 88 remote from the fifth window 106. The fifth groove 112 has the same cross sectional shape as the second groove 98 of the first orifice-defining member 86. The sixth groove 114 communicates at one end thereof with the fifth window 106, and the other end is located at the end of the member 88 remote from the fourth window 104. The sixth groove 114 has the same cross sectional area as the third groove 100 of the first orifice-defining member 86.

The second window 92 formed through the first orifice-defining member 86 is fluid-tightly closed by a first flexible diaphragm 116, which is an integral part of the rubber filler 94. The fourth window 104 formed through the second orifice-defining member 88 is closed fluid-tightly by a second flexible diaphragm 118, which is an integral part of the rubber filler 108. These two flexible diaphragms 116 and 118 have a sufficiently small thickness, and are easily elastically deformed or displaced.

The thus constructed first and second orifice-defining members 86, 88 are butted together at their circumferential end faces, to form an annular orifice-defining structure wherein the first, second and third grooves 96, 98 and 100 communicate with the fourth, fifth and sixth grooves 110, 112 and 114, respectively. This annular orifice-defining structure is oriented such that the first and second windows 90, 92 are exposed to the pressure-receiving chamber 58, while the third, fourth and fifth windows 102, 104, 106 are exposed to the equilibrium chamber 60.

The first and fourth grooves 96, 110 and the first and third windows 90, 102 cooperate with the outer sleeve 13 to define a first orifice passage 120 for fluid communication between the pressure-receiving and equilibrium chambers 58, 60. The second and fifth grooves 98, 112 and the second flexible diaphragm cooperate with the outer sleeve 13 to define a second orifice passage 122 having a higher ratio S/L than the first orifice passage 120, while the third and sixth grooves 100, 114, fifth window 106 and first flexible diaphragm 116 cooperate with the outer sleeve 13 to define a third orifice passage 124 having a higher ratio S/L than the second orifice passage 122. S and L represent the cross sectional area and length of the orifices 120, 122, 124, respectively. The second orifice passage 122 extends between the two fluid chambers 58, 60, and permits volume changes of these fluid chambers due to elastic deformation or displacement of the second flexible diaphragm 118, which causes the fluid flows through the passage 122. The third orifice passage 124 also extends between the two fluid chambers 58, 60 and permit volume changes of these chambers due to elastic displacement of the first flexible diaphragm 116.

The first orifice passage 120 is tuned so as to exhibit a high damping effect with respect to the shake, bounce and other low-frequency vibration of about 10-15 Hz, based on the resonance of the fluid flowing through the passage 120. The second orifice passage 122 is tuned so as to exhibit a sufficiently low dynamic spring contact with respect to the engine idling vibration and other medium-frequency vibration of about 20-30 Hz, based on the resonance of the fluid flowing through the second orifice passage 122. Further, the third orifice passage 124 is tuned to exhibit a sufficiently low dynamic spring contact with respect to the booming noise and other high-frequency vibration of about 100-150 Hz, based on the resonance of the fluid flowing through the orifice passage 124.

It will be understood that the first and third windows 90, 102 and the first and fourth grooves 96, 110 correspond to the first window 48 and the first groove 53 of the orifice-defining member 44 of the first embodiment, respectively, and that the fourth window 104, second and fifth grooves 98, 112 and second flexible diaphragm 118 correspond to the second window 50, second groove 54 and flexible diaphragm 56 of the orifice-defining member 44, respectively.

When the shake, bounce or other low-frequency vibration is applied to the engine mount 80, the fluid is forced to flow through the first orifice passage 120, with the amount of the fluid flows through the second and third orifice passages 122, 124 being restricted by the spring stiffness or deformation resistance of the second and first flexible diaphragms 118, 116. Namely, the amount of flow of the fluid through the second and third orifice passages 122, 124 is limited, and the pressure change in the pressure-receiving cheer 58 is absorbed substantially by fluid flow through the first orifice passage 120. Thus, the low-frequency vibration can be effectively damped substantially based on the resonance of the fluid flowing through the first orifice passage 120.

When the engine idling vibration or other medium-frequency vibration is applied to the engine mount 80, substantially no fluid flow occurs through the first orifice passage 120, and the first diaphragm 116 undergoes only a slight elastic displacement, whereby the amount of flow of the fluid through the third orifice passage 124 is limited. On the other hand, the second flexible diaphragm 118 undergoes a relatively large amount of elastic displacement due to the pressure change in the pressure-receiving chamber 58 caused by the medium-frequency vibration. Accordingly, a sufficiently large amount of the fluid is forced to flow through the second orifice passage 122, whereby the engine mount 80 exhibits an effectively reduced spring constant based on the resonance of the fluid flowing through the second orifice passage 122.

When the booming noise or other high-frequency vibration having a small amplitude is applied to the engine mount 80, the amounts of flow of the fluid through the first and second orifice passages 120, 122 is almost negligible as if the passages 120, 122 were closed, and the fluid is forced to flow through the third orifice passage 124. Consequently, the engine mount 80 exhibits an effectively reduced dynamic spring constant with respect to the high-frequency vibration, based on the resonance of the fluid flowing through the third orifice passage 124.

Thus, the first, second and third orifice passages 120, 122, 124 provided in the present engine mount 80 cooperate with each other to effective damp the input vibrations over a frequency range wider than the range covered by the first and second orifice passages 62, 64 provided in the engine mount 10, 70, 76 of the first embodiment.

Since the first, second and third orifice passages 120, 122, 124 are formed by the rubber fillers 94, 108 of the first and second orifice-defining members 86, 88, the lengths and cross sectional areas of these orifice passages 120, 122, 124 can be easily determined by suitably forming the rubber fillers 94, 108. That is, the frequency bands of the vibrations to be damped by the three orifice passages 120, 122, 124 can be easily changed by simply changing the design of the two rubber fillers 94, 108, without changing the orifice-defining members 86, 88. Further, the first and second flexible diaphragms 116, 118 are formed integrally with the rubber fillers 94, 108. Thus, the present second embodiment has the same advantage as the first embodiment, in terms of the number of the required components and ease and efficiency of manufacture of the engine mount.

While the present invention has been described in its presently preferred embodiments, it is to be understood that the invention is not limited to the details of the illustrated embodiments, but may be otherwise embodied.

For instance, the lengths and cross sectional areas of the orifice passages are not confined to the details of the illustrated embodiments, but may be changed as desired depending upon the required damping characteristics of the elastic mount.

In the illustrated embodiments, the wing member 32 is disposed within the pressure-receiving chamber 58, so as to provide the resonance portion 66. However, the wing member 32 is not essential to practice the present invention.

Although the illustrated embodiments have a first fluid chamber in the form of the pressure-receiving chamber whose fluid pressure changes upon application of a vibrational load, and a second fluid chamber in the form of the equilibrium chamber whose volume is easily changed, the equilibrium chamber may be replaced by a second pressure-receiving chamber.

The flexible diaphragm 56, 118 associated with the second orifice passage 64, 122 may include a canvas embedded in a rubber material, so that the amount of elastic deformation of the diaphragm is suitably controlled by the canvas.

While the illustrated fluid-filled cylindrical elastic mounts are adapted to be used as an engine mount for mounting a power unit on the body of a motor vehicle, the elastic mounts of the invention may be used for other purposes, for example, as a differential mount and a suspension bushing of the motor vehicle, or as cylindrical dampers for various devices and equipment other than those provided on the motor vehicle.

It is also to be understood that the present invention may be embodied with various other changes, modifications and improvements, which may occur to those skilled in the art, without departing from the spirit and scope of the invention defined in the following claims.

What is claimed is:

1. A fluid-filled cylindrical elastic mount comprising:
    an inner and an outer sleeve which are radially spaced apart from each other;
    an elastic body interposed between said inner and outer sleeves, for elastically connecting the inner and outer sleeves, said elastic body having a first and a second pocket formed in respective diametrically opposite circumferential portions thereof, said first and second pockets being open in an outer circumferential surface of said elastic body;
    said first and second pockets cooperating with said outer sleeve to define a first and a second fluid chamber, respectively, said first and second fluid chambers being filled with a non-compressible fluid;
    an orifice-defining structure interposed between said outer sleeve and said elastic body, and extending in a circumferential direction of said outer sleeve, so as to cover at least one of said first and second pockets, said orifice-defining structure having a circumferential recess open in a radially outward direction of said outer sleeve, said orifice-defining structure having a first and a second window formed through said circumferential wall;
    a rubber filler provided in said circumferential recess, and having a first and second groove which extend from said first and second windows, respectively;
    a flexible diaphragm formed integrally with said rubber filler and closing said second window;
    said first groove and said first window cooperating with said outer sleeve to define a first orifice passage for fluid communication between said first and second fluid chambers; and
    said second groove cooperating with said outer sleeve to define a second orifice passage which permits said fluid to flow between a region of said second orifice passage adjacent said flexible diaphragm and said second fluid chamber, through elastic displacement of said flexible diaphragm, said second orifice passage having a higher ratio S/L than said first orifice passage, where S and L respectively represent a cross sectional area and a length of said first and second orifice passages.

2. A fluid-filled cylindrical elastic mount according to claim 1, wherein said orifice-defining structure extends so as to cover both of said first and second pockets.

3. A fluid-filled cylindrical elastic mount according to claim 2, wherein said orifice-defining structure consists of a pair of semi-circular men%hers which are butted together at opposite ends thereof to form a circular orifice-defining structure interposed between said outer sleeve and said elastic body.

4. A fluid-filled cylindrical elastic mount according to claim 3, wherein said first pocket and said outer sleeve cooperate to define as said first fluid chamber a pressure-receiving cheer, a pressure of said fluid in said pressure-receiving cheer changing upon application of a vibrational load between said inner and outer sleeves, said second pocket and said outer sleeve cooperating to define as said second fluid cheer an equilibrium chamber whose volume is changeable to absorb a pressure change of the fluid therein.

5. A fluid-filled cylindrical elastic mount according to claim 4, wherein said pair of semi-circular members extend so as to cover said first and second pockets, respectively.

6. A fluid-filled cylindrical elastic mount according to claim 5, wherein one of said pair of semi-circular members extends so as to cover said first pocket which partially defines said pressure-receiving chamber, while the other of said pair of semi-circular members extends so as to cover said second pocket which partially defines said equilibrium chamber.

7. A fluid-filled cylindrical elastic mount according to claim 6, wherein said first and second windows are both formed in said other of said pair of semi-circular members, so that said first window communicates with said equilibrium chamber while said flexible diaphragm is exposed to said equilibrium chamber.

8. A fluid-filled cylindrical elastic mount according to claim 3, wherein said first and second windows are both formed in one of said pair of semi-circular members, so that said first window communicates with one of said first and second fluid chambers while said flexible diaphragm is exposed to said one of the first and second fluid chambers.

9. A fluid-filled cylindrical elastic mount according to claim 8, wherein said circular orifice-defining structure has a third window, and said rubber filler has a third groove extending from said third window, and another flexible diaphragm closing said third window, said third groove cooperating with said outer sleeve to define a third orifice passage which permits said fluid to flow between said first and second fluid chambers, through elastic displacement of said another flexible diaphragm, said third orifice passage having a higher ratio S/L than said second orifice passage, where S and L respectively represent the cross sectional area and length of said second and third orifice passages.

10. A fluid-filled cylindrical elastic mount according to claim 9, wherein said first orifice passage is tuned so as to provide a high damping effect with respect to vibrations having frequencies in the neighborhood of 10-15 Hz, said second orifice passage being tuned so as to provide an effectively low dynamic spring constant with respect to vibrations having frequencies in the neighborhood of 20-30 Hz, said third orifice passage being tuned so as to provide an effectively low dynamic spring constant with respect to vibrations having frequencies in the neighborhood of 100-150 Hz.

11. A fluid-filled cylindrical elastic mount according to claim 1, wherein said orifice-defining structure consists of a generally semi-circular member and extends to as to cover one of said first and second pockets.

12. A fluid-filled cylindrical elastic mount according to claim 11, wherein said first window is located near one of opposite ends of said circumferential recess, while said second window closed by said flexible diaphragm is located near the other of said opposite ends.

13. A fluid-filled cylindrical elastic mount according to claim 12, wherein said first groove communicates at one of opposite ends thereof with one of said first and second fluid chambers through said first window, and at the other of said opposite ends with the other of said first and second fluid chambers, said second groove substantially communicating at one of opposite ends thereof with said one of the first and second fluid chambers through said flexible diaphragm, and communicating at the other of said opposite ends thereof with said other of the first and second fluid chambers.

14. A fluid-filled cylindrical elastic mount according to claim 13, wherein said opposite ends of said first groove are both located at said one of opposite ends of said circumferential recess, while said opposite ends of said second groove are both located at said other of the opposite ends of the circumferential groove.

15. A fluid-filled cylindrical elastic mount according to claim 11, wherein said first pocket and said outer sleeve cooperate to define as said first fluid chamber a pressure-receiving chamber, a pressure of said fluid in said pressure-receiving chamber changing upon application of a vibrational load between said inner and outer sleeves, said second pocket and said outer sleeve cooperating to define as said second fluid chamber an equilibrium chamber whose volume is changeable to absorb a pressure change of the fluid therein.

16. A fluid-filled cylindrical elastic mount according to claim 15, wherein said orifice-defining structure extends so as to cover said first pocket which partially defines said pressure-receiving chamber.

17. A fluid-filled cylindrical elastic mount according to claim 16, wherein said first window communicates with said pressure-receiving chamber, while said flexible diaphragm is exposed to said pressure-receiving chamber.

18. A fluid-filled cylindrical elastic mount according to claim 15, wherein said orifice-defining structure extends so as to cover said second pocket which partially defines said equilibrium chamber.

19. A fluid-filled cylindrical elastic mount according to claim 18, wherein said first window communicates with said equilibrium chamber, while said flexible diaphragm is exposed to said equilibrium chamber.

20. A fluid-filled cylindrical elastic mount according to claim 1, wherein said first orifice passage is tuned so as to provide a high damping effect with respect to vibrations having frequencies in the neighborhood of 10-15 Hz, and said second orifice passage is tuned so as to provide an effectively low dynamic spring constant with respect to vibrations having frequencies in the neighborhood of 20-30 Hz.

21. A fluid-filled cylindrical elastic mount according to claim 1, further comprising an intermediate sleeve interposed between said elastic body and said outer sleeve, said intermediate sleeve having a first and a second opening corresponding to said first and second pockets, said orifice-defining member being disposed between said intermediate sleeve and said outer sleeve such that said orifice-defining member covers at least one of said first and second openings.

22. A fluid-filled cylindrical elastic mount according to claim 21, wherein said orifice-defining member partially engages an outer circumferential surface of said intermediate sleeve.

23. A fluid-filled cylindrical elastic mount according to claim 21, wherein said intermediate sleeve has a spacer layer formed on a portion of an outer circumferential surface thereof, said orifice-defining member partially engages said spacer layer, such that there is provided a radial gap between an inner circumferential surface of said orifice-defining member and the other portion of the outer circumferential surface of said intermediate sleeve.

* * * * *